United States Patent [19]
Hardison

[11] Patent Number: 5,122,351
[45] Date of Patent: Jun. 16, 1992

[54] METHOD AND APPARATUS FOR REMOVING H2S FROM A PROCESS GAS AND RECOVERING SULFUR

[75] Inventor: Leslie C. Hardison, Barrington, Ill.
[73] Assignee: ARI Technologies Inc., Palatine, Ill.
[21] Appl. No.: 630,826
[22] Filed: Dec. 20, 1990
[51] Int. Cl.$^5$ .............................................. C01B 17/16
[52] U.S. Cl. .................................... 423/220; 423/563; 423/567 R; 23/293 S
[58] Field of Search ............ 423/140, 141, 154, 242 A, 423/242 R, 236, 563, 567 A, 567 R, 578, 574 L, 220; 23/293 S; 201/12; 159/47.3

[56] References Cited

U.S. PATENT DOCUMENTS

| | | | |
|---|---|---|---|
| 3,638,708 | 2/1972 | Farin | 159/47 WL |
| 3,887,682 | 1/1975 | Kumata | 423/232 |
| 4,083,944 | 4/1978 | Chalmers | 423/567 A |
| 4,236,974 | 12/1980 | Kühnlein | 203/11 |
| 4,375,450 | 3/1983 | Katagiri | 422/170 |
| 4,844,881 | 7/1989 | Gens | 423/574 R |
| 4,855,124 | 8/1989 | Matsuoka | 423/574 L |
| 4,935,221 | 6/1990 | Bronfenbrenner | 423/574 R |
| 4,976,935 | 12/1990 | Lynn | 423/222 |

FOREIGN PATENT DOCUMENTS 1298861 12/1972 United Kingdom ........... 423/567 A

*Primary Examiner*—Gary P. Straub
*Assistant Examiner*—Timothy C. Vanoy
*Attorney, Agent, or Firm*—Marshall, O'Toole, Gerstein, Murray & Bicknell

[57] ABSTRACT

A catalytic polyvalent metal redox solution can be recovered and re-used in a catalytic polyvalent metal redox solution H2S-removal, sulfur production process by interposing a closed loop evaporator/condenser process and apparatus in the sulfur washing/filtering-/recovery process and apparatus so that wash water used to purify the sulfur, and any polyvalent metal redox solution recovered from the sulfur melter are fed to an evaporator to concentrate the redox solution to a concentration capable of effective absorption of H2S, and the water evaporated in the evaporator is condensed as pure water for use in washing and/or filtering the recovered sulfur.

18 Claims, 1 Drawing Sheet

METHOD AND APPARATUS FOR REMOVING H₂S FROM A PROCESS GAS AND RECOVERING SULFUR

FIELD OF THE INVENTION

The present invention is directed to a method and apparatus for selectively removing H$_2$S gas from a process gas stream using a polyvalent metal catalyst solution, such as an iron chelate absorption solution, e.g. the ARI Technologies Inc. LO-CAT ® solution, or a metal vanadate-containing absorption solution together with an anthraquinone disulfonate, such as that used in the Stretford process, to react the H$_2$S gas selectively from the process gas stream to form elemental sulfur. More particularly, the present invention is directed to a method and apparatus for removing H$_2$S from a process gas using a catalytic polyvalent metal redox absorption solution, that forms elemental sulfur and includes a melting device for separation of molten sulfur from catalytic polyvalent metal redox solution. The process and apparatus of the present invention include sulfur washing apparatus that washes the sulfur recovered from the polyvalent metal redox solution with salt-free water and recovers wash water and polyvalent metal redox solution from the wash water, in a suitable concentration for re-use, by evaporation and condensation of wash water. The resulting sulfur is of higher purity and the process eliminates the formation of polyvalent metal polysulfides, e.g. FeS$_2$ and FeS$_3$, and the like, that otherwise form in the sulfur melter due to the presence of excessive salts from the redox solution if the melter is operated at too high a temperature or melting is continued for too long a time period. The process and apparatus of the present invention are adaptable to any H$_2$S removal process that uses a polyvalent metal redox solution in two valence states for absorption of H$_2$S, and regeneration of polyvalent metal redox solution, with or without other impurities.

BACKGROUND OF THE INVENTION AND PRIOR ART

Two of the most widely used processes for removal of H$_2$S from process gas streams are the catalytic processes that use 1) an iron chelate absorption solution, e.g. the LO-CAT ® process, and 2) a metal vanadate absorption solution, e.g. the Stretford process. The oxidation-reduction reactions that permit these processes to be carried out continuously are well known to those skilled in the H$_2$S removal art and are well documented in the literature. The ferric iron chelate-H$_2$S reactions can be represented as follows:

$$H_2S(gas) + H_2O(Liquid) \rightleftharpoons H_2S(aqueous) + H_2O(Liquid)$$

$$H_2S(aqueous) \rightleftharpoons H^+ + HS^-$$

$$HS^- \rightleftharpoons H^+ + S^=$$

$$S^= + 2(Fe.Chelate)^{+3} \rightarrow S° (solid) + 2(Fe.Chelate)^{+2}$$

By combining these equations, the resulting equation is:

$$H_2S(gas) + 2(Fe.Chelate)^{+3} \rightarrow 2H^+ + 2(Fe.Chelate)^{+2} + S°$$

In order to have an economical, workable process to effect catalytic oxidation of the hydrogen sulfide using an iron chelate absorption solution, it is essential that the hydrogen sulfide gas be brought continuously into intimate contact with the chelated iron solution and that the ferrous iron chelate formed in the above described manner be continously regenerated by oxidizing to ferric iron chelate by intimate contact with dissolved oxygen, preferably in the form of ambient air. The series of reactions that take place when regenerating the required ferric iron chelate can be represented by the following equations:

$$O_2(gas) + 2H_2O \rightleftharpoons O_2(aqueous) + 2H_2O$$

$$O_2(aqueous) + 2H_2O + 4(Fe.Chelate)^{+2} \rightarrow 4(OH^-) + 4(Fe.Chelate)^{+3}$$

The economics and workability of the Stretford process have depended upon a large volume of the vanadium solution, and that the reduced metal vanadate, after absorption of the H$_2$S (as HS$^-$ and S$^=$) to form the metal vanadate in the +4 valance state is continously regenerated to the +5 valance state by contact with dissolved oxygen for further use of the oxidized metal vanadate in an absorption zone of the process to remove additional H$_2$S as elemental sulfur. The Stretford process chemistry is typically summarized according to the following steps: Absorption and dissociation of H$_2$S into alkali:

$$2H_2S(g) + 2Na_2CO_3 \rightleftharpoons 2NaHS + 2NaHCO_3;$$

Bisulfide oxidation with metavanadate to form elemental sulfur and reduced vanadium:

$$2NaHS + 4NaVO_3 + H_2O \rightleftharpoons Na_2V_4O_9 + 4NaOH + 2S; \text{ and}$$

Vanadium reoxidation by dissolved molecular oxygen in the presence of ADA:

$$Na_2V_4O_9 + 2NaOH + O_2 \xrightarrow[H_2ADA]{ADA} 4NaVO_3 + H_2O.$$

The larger catalytic polyvalent metal redox H$_2$S absorption processes, e.g. the LO-CAT ® process and the Stretford process, separate the sulfur recovered in the absorber and/or oxidizer chambers of the process by pumping a sulfur/polyvalent metal redox solution slurry to a melting device that melts the sulfur for physical separation of molten sulfur from the catalyst solution and water. The sulfur produced has a purity on the order of 99.9% with ash contents ranging from about 100 to about 400 ppm.

The sulfur recovered from the melter is suitable for many commercial uses, but may be objectional for some markets because 1) the ash content is higher than desirable for sulfuric acid plant catalysts; and 2) there may be inclusions of solid salts in the molten sulfur caused by entrainment of salt-containing catalyst solution in the liquid sulfur leaving the bottom of a sulfur separator (melter).

In addition, there is a troublesome recurrent operating problem in the sulfur melters caused by a combination of excessive salt concentration, higher than normal temperature and excessive residence time. The result is the formation of polyvalent metal polysulfides, e.g. FeS$_2$ or FeS$_3$ which deposit as intractable solid material on the melter heat transfer surface and in the sulfur separator.

Some prior art attempts to solve these problems have included 1) filtering the sulfur/redox solution slurry and reslurrying the sulfur with salt-free water; and 2) washing the sulfur, in the form of a cake, on a continuous belt filter using fresh water while removing the wash water from the washed sulfur using a vacuum system prior to reslurrying the sulfur, with salt-free water, and melting the slurry. While these attempts to purify the sulfur product have been successful in achieving higher purity sulfur, the washing and reslurrying steps have added substantial cost to the H$_2$S removal, sulfur production process due to the substantial cost of catalytic polyvalent metal redox ingredients lost in the filtering and washing steps. Further, the wash water cannot be returned to the catalytic polyvalent metal redox solution used in the H$_2$S absorption process (LO-CAT® or Stretford processes) without upsetting the water balance required, and making it necessary to withdraw and discard solution to keep the system from overflowing.

The loss of catalytic polyvalent metal redox solution has been greatly reduced or eliminated in accordance with the present invention by recovering the wash water and separating the wash water and redox solution recovered from the sulfur purification and separation steps of the process into re-usable polyvalent metal redox solution and pure water for re-use in washing recovered sulfur.

As a further advantage, the evaporation process and apparatus of the present invention can be operated in such a way to bring about crystallization of metal sulfates, e.g. sodium sulfate, or other salts of limited water solubility, which can be discarded with substantially no loss of catalyst solution.

SUMMARY OF THE INVENTION

In accordance with the present invention, it has been found that the catalytic polyvalent metal redox solution can be recovered and re-used in the catalytic polyvalent metal redox solution H$_2$S-removal, sulfur production process by interposing closed loop evaporator/condenser processes and apparatus in the sulfur washing-/filtering/recovery process and apparatus so that process water or diluted process redox solution from any point in the process, e.g. wash water used to purify the sulfur, and/or any polyvalent metal redox solution recovered from the process, e.g. from the sulfur melter, are fed to an evaporator to concentrate the redox solution, preferably to a concentration capable of effective absorption of H$_2$S, and the water evaporated in the evaporator is condensed as pure water for use in washing and/or filtering the recovered sulfur.

Accordingly, one aspect of the present invention is to provide a new and improved method and apparatus for the recovery of high purity sulfur from an H$_2$S-containing gas stream using a catalytic polyvalent metal redox absorption solution to convert H$_2$S to elemental sulfur.

Another aspect of the present invention is to provide a new and improved method and apparatus for the recovery of high purity sulfur from an H$_2$S-containing gas stream using a catalytic polyvalent metal redox absorption solution that includes a sulfur washing step and a method and apparatus capable of treating water from any point in the process for reusing the wash water particularly for recovery of the wash water for further sulfur washing or for sulfur slurrying and, optionally, for concentrating diluted redox solution for recycling to the H$_2$S removal process for further H$_2$S absorption.

BRIEF DESCRIPTION OF THE DRAWING

The above and other aspects and advantages of the present invention will become apparent from the following detailed description of the preferred embodiments, taken in conjunction with the drawing, wherein.

DETAILED DESCRIPTION OF THE PREFERRED EMBODIMENTS

Figure 1:
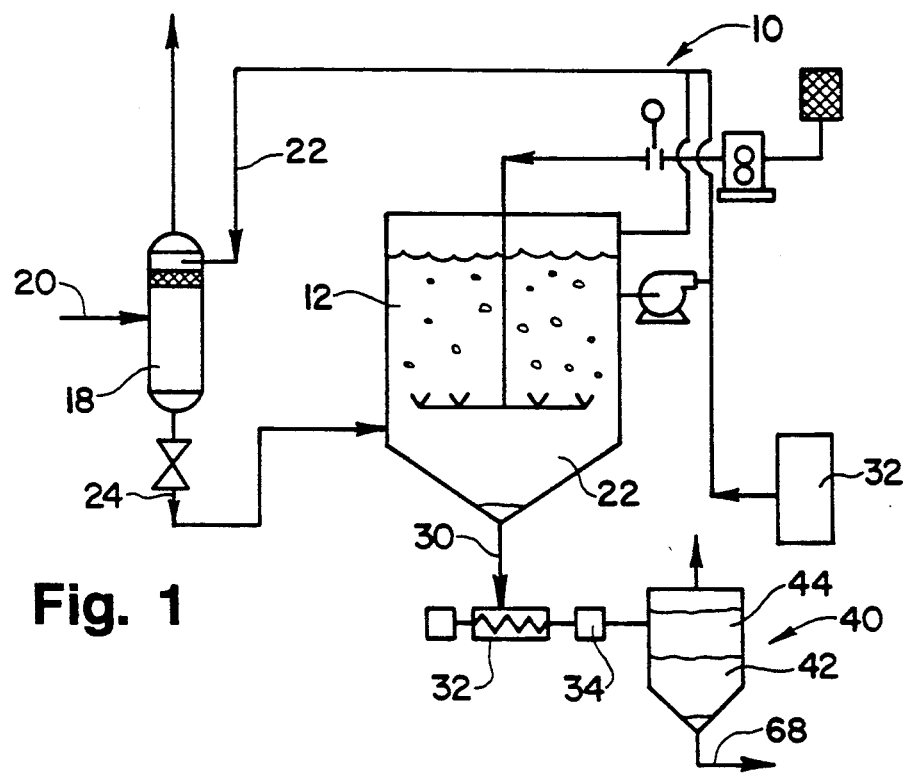
FIG. 1 is a schematic side view representing any H$_2$S-removal, sulfur recovery process utilizing a catalytic polyvalent metal redox solution in two valence states for reacting H$_2$S to elemental sulfur and water, such as a LO-CAT® or Stretford process, including sulfur washing means for recovery of high purity sulfur.

Turning now to the drawings, and initially to FIG. 1, one of many possible H$_2$S-removal, sulfur recovery processes and apparatus, generally designated 10, is illustrated that employs a catalytic polyvalent metal redox solution 12 in one valence state (Fe$^{+3}$ or V$^{+5}$) in an absorber section 18 of the apparatus, for removal of H$_2$S from a process gas stream and where the polyvalent metal redox solution is reduced to a second valence state (Fe$^{+2}$ or V$^{+4}$) fed to the absorber through conduit 20; and an oxidizer section 22 of the apparatus where the catalytic polyvalent metal redox solution 12 is oxidized with finely dispersed air bubbles fed to the redox solution 12 through air sparger 24 to convert the polyvalent metal redox solution back to the higher valence state (Fe$^{+3}$ or V$^{+5}$). As illustrated in FIG. 1, the absorber 18 is a packed tower, and the oxidizer 22 is a simple contact vessel achieving gas/liquid contact by dispersing fine air bubbles through the redox solution. In the apparatus shown in FIG. 1, sulfur is recovered from the oxidizer 22, but any apparatus capable of achieving oxidation-reduction reactions that react H$_2$S with the catalytic polyvalent metal redox solution to form elemental sulfur in either the oxidizer 22 or absorber 18, and regeneration of the catalytic polyvalent metal redox solution, is useful in accordance with the method and apparatus of the present invention, including autocirculation methods and apparatus, as is U.S. Pat. No. 4,238,462, hereby incorporated by reference. The present invention is directed to purifying the sulfur recovered, initially recovered in admixture with catalytic polyvalent metal redox solution, and processing the sulfur/redox solution to recover the catalytic polyvalent metal redox solution and to recover any wash water used to purify the sulfur, regardless of the particular construction of absorber and oxidizer vessels.

As shown in the process and apparatus of FIG. 1, H$_2$S is oxidized to elemental sulfur and water in the oxidizer vessel 22 and the sulfur is recovered from the bottom of the oxidizer vessel 22 as a slurry of sulfur and catalytic polyvalent metal redox solution in conduit 30. The sulfur/polyvalent metal redox slurry is pumped by slurry pump 32 to a water wash system, generally designated 34, via conduit 36, and the washed sulfur is fed via conduit 38 to a sulfur melter or separator 40 where the sulfur 42 is separated from water and catalytic polyvalent metal redox solution 44. In accordance with prior art processes, the catalytic polyvalent metal redox solution 44 was discarded to a waste water treatment plant, or sometimes sent to the oxidizer 12. The present invention. as illustrated in FIG. 2, provides a closed loop polyvalent metal redox solution/wash water recovery method and apparatus to prevent costly losses of catalytic polyvalent metal redox solution otherwise lost in the water wash purification of catalytic polyvalent metal redox sulfur recovery processes.

Figure 2:
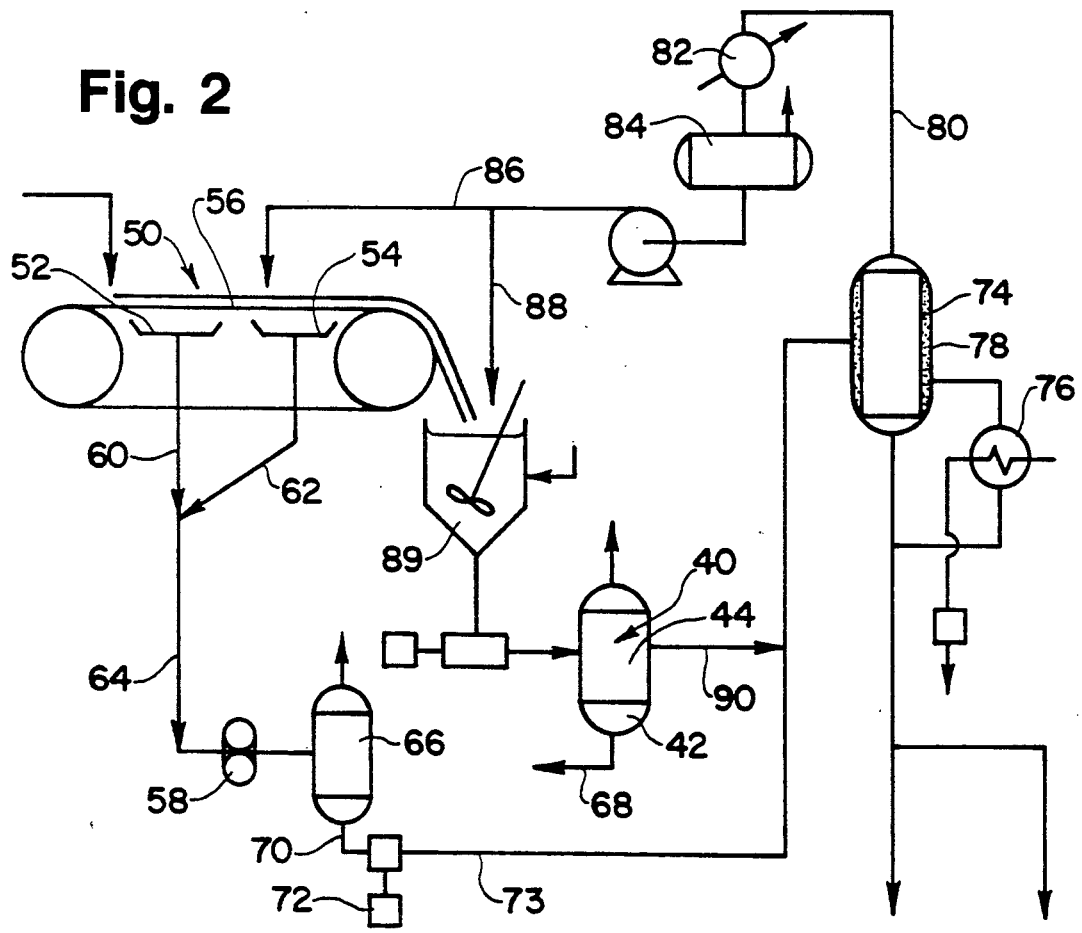
FIG. 2 is a schematic side view of the sulfur washing and high purity sulfur recovery portion of the method and apparatus of the present invention.

Turning to FIG. 2, a specific method and apparatus for washing the recovered sulfur with water is shown to include a continuous water-pervious conveyor belt apparatus, generally designated 50, includes vacuum suction devices 52 and 54 disposed directly under the continuous, water-pervious belt 56 that receives the slurry of sulfur and polyvalent metal redox solution. Vacuum pump 58 draws wash water through the solid sulfur on belt 56 to wash the sulfur free of salts and polyvalent metal redox solution, and conveys the wash water, and polyvalent metal redox solution along conduits 60, 62 and 64 into a dilute redox solution holding vessel 66. The washed sulfur falls from the conveyor belt 56 into a reslurry tank where the sulfur is slurried with an appropriate quantity, e.g. 0.1 to 5 parts by weight water per part of sulfur, of purified salt-free water, and the slurry is conveyed through lower outlet conduit 68, to the melter 40, where molten sulfur 42 is separated from a combination of water and polyvalent metal redox solution 44.

The dilute redox solution in holding vessel 66, comprising mostly wash water and some catalytic polyvalent metal redox solution, is conveyed along conduit 70 by pump 72 and along conduit 73 to jacketed evaporator vessel 74, heated with steam from boiler 76 in an outer jacket 78, to increase the temperature of the dilute polyvalent metal redox solution to a level above its boiling point, thereby evaporating water that exits the evaporator 74 as pure water vapor through an upper water vapor outlet conduit 80. The water vapor then is cooled to condense the vapor as pure water via heat exchanger 82, and the pure water is collected in wash water reservoir 84 for conveyance via conduits 86 and 88 for use in washing sulfur on belt 56, and for re-slurrying sulfur in re-slurry tank 89.

The dilute solution 44 that is separated from the molten sulfur in melter 40 is pumped from an upper portion of the melter 40 along conduits 90 and 73 into the evaporator 74, together with the dilute solution from holding vessel 66 for separation of catalytic polyvalent metal redox solution and wash water in accordance with the present invention.

It should be understood that while a "single effect" evaporator/condensor is shown in FIG. 2, substantial improvements in operating cost may be obtained by using a multiple effect evaporator, in which much of the heat of vaporization is supplied by recondensation of the water vapor at a slightly higher pressure.

It should be understood that the present disclosure has been made only by way of preferred embodiments and that numerous changes in details or construction, combination and arrangement of parts and process steps can be resorted to without departing from the spirit and scope of the invention as hereunder claimed.

What is claimed is:

1. In a process for removing $H_2S$ and recovering sulfur from an $H_2S$-containing process gas wherein the sulfur is melting in a sulfur melting device for separation of sulfur from water including:

intimately contacting the process gas with an aqueous polyvalent metal redox solution to absorb the $H_2S$ into the polyvalent metal redox solution, while simultaneously forming a reduced polyvalent metal redox solution, and subsequently oxidizing the reduced polyvalent metal redox solution sufficiently to regenerate the polyvalent metal redox solution, to form an oxygenated polyvalent metal redox solution capable of again absorbing $H_2S$ from said process gas, and to convert dissolved $H_2S$ to elemental sulfur, including the steps of:

separating the elemental sulfur from a majority of the polyvalent metal redox solution; and washing the polyvalent metal redox solution from the sulfur with wash water; the improvement comprising:

recovering the wash water and polyvalent metal redox solution removed from the sulfur for recycle to the process;

introducing the recovered wash water and the polyvalent metal redox solution removed from the sulfur to an evaporator, to evaporate sufficient wash water therefrom such that the polyvalent metal redox solution remaining in the evaporator is sufficiently concentrated for further absorption of $H_2S$ from the process gas, and removing the evaporated water from the evaporator;

condensing the evaporated water removed from the evaporator as pure condensed water;

using the pure condensed water as said wash water for washing the elemental sulfur;

recovering the polyvalent metal redox solution from the evaporator; and recycling the recovered polyvalent metal redox solution for further absorption of $H_2S$ from the process gas.

2. A process as defined in claim 1 further including the steps of:

adding pure condensed wash water to the washed sulfur to form a slurry of washed sulfur, and water;

conveying the slurry to the sulfur melting device;

heating the slurry in the sulfur melting device to a temperature sufficient to melt the sulfur in the slurry to form a high purity molten sulfur, and a mixture of water and polyvalent metal redox solution, and conveying the mixture of water and polyvalent metal redox solution to the evaporator for separate recovery of wash water and polyvalent metal redox solution, each for re-use in the process.

3. A process as defined in claim 2 wherein the sulfur is washed on a water-pervious conveyor belt including the step of applying vacuum suction under the belt for drawing the wash water and polyvalent metal redox solution through the sulfur.

4. A process as defined in claim 3 further including adding a portion of the water condensed from the evaporator to the washed sulfur to form the slurry of washed sulfur, water and polyvalent metal redox solution.

5. A process as defined in claim 1 wherein the polyvalent metal redox solution includes a redox catalyst, and wherein dissolved salts in the polyvalent metal redox solution are crystallized in the evaporator upon concentration of the redox solution as substantially catalyst free solid crystals.

6. A process as defined in claim 5 wherein the crystals formed in the evaporator comprise a metal sulfate.

7. A process as defined in claim 6 wherein the metal sulfate is principally sodium sulfate.

8. A process as defined in claim 5 wherein the crystals formed in the evaporator are principally potassium bicarbonate.

9. A process as defined in claim 7 further including the step of recovering the sodium sulfate.

10. In an apparatus for effecting mass transfer of a liquid reagent sequentially with two different gases in a separate mass transfer zone for each gas without permitting both gases to contact the same portion of the liquid simultaneously, including a first mass transfer zone for mass transfer between a liquid reagent and a sulfur-containing gas into the first mass transfer zone; a second mass transfer zone in liquid, but not vapor, communication with the first mass transfer zone; means for directing the liquid reagent from the first mass transfer zone into the second mass transfer zone; means for directing a second gas into the second mass transfer zone for intimate contact and mass transfer therebetween; including means for recovering sulfur from the first or second mass transfer zone;

means for separating the recovered sulfur from the liquid reagent; and means for washing the sulfur; the improvement comprising:

means for recovering sulfur wash water and liquid reagent from the sulfur;

means for separating a portion of the sulfur wash water, in non-contaminated form, from the liquid reagent; and means for recycling the separated wash water to the sulfur washing means.

11. In an apparatus as defined in claim 10 further including means for recycling the liquid reagent, after separation of a portion of the sulfur wash water, back to the first or second mass transfer zone for recover of sulfur.

12. In an apparatus as defined in claim 11 wherein the means for separating the recovered sulfur from the liquid reagent includes a liquid-porous filter, and wherein the means for recovering wash water and liquid reagent further includes liquid receiving means disposed on a down stream side of the filter for recovering wash water and liquid reagent.

13. In an apparatus as defined in claim 12 wherein the means for separating a portion of the sulfur wash water from the liquid reagent comprises an evaporator adapted to vaporize a portion of the wash water from the liquid reagent, and means to condense the evaporated wash water, outside of said evaporator, for use in washing said recovered sulfur.

14. In an apparatus as defined in claim 10 further including means for slurrying the recovered and washed sulfur with water.

15. In an apparatus as defined in claim 10 wherein the means for separating the recovered sulfur from the liquid reagent comprises a sulfur melting device.

16. In an apparatus as defined in claim 15 further including means for recovering water and liquid reagent from the sulfur melting device; and means for introducing the recovered water and liquid reagent recovered from the melting device into the evaporator.

17. In an apparatus as defined in claim 12 wherein the means for recovering the sulfur wash water and liquid reagent includes a water-pervious conveyor belt including vacuum suction means disposed beneath the belt.

18. In a method as defined in claim 10 further including means for evaporating a portion of the wash water in the liquid reagent recovered from the sulfur washing means; and means for condensing the evaporated water for use in washing the sulfur.

* * * * *